United States Patent [19]

Geller

[11] 4,071,909
[45] Jan. 31, 1978

[54] DIGITAL INTERFACE SYSTEM FOR A PRINTER

[75] Inventor: Stephen I. Geller, Pasadena, Calif.

[73] Assignee: Xerox Corporation, Stamford, Conn.

[21] Appl. No.: 728,084

[22] Filed: Sept. 30, 1976

[51] Int. Cl.² ............................................. G06F 3/12
[52] U.S. Cl. ............................................. 364/900
[58] Field of Search ............... 340/172.5, 324 AD; 445/1; 178/30; 346/33 R; 197/1 R; 364/900 MS

[56] References Cited

U.S. PATENT DOCUMENTS

| | | | |
|---|---|---|---|
| 3,634,828 | 1/1972 | Myers et al. | 340/172.5 |
| 3,719,781 | 3/1973 | Fulton et al. | 178/30 |
| 3,803,629 | 4/1974 | Walsh et al. | 340/324 AD X |
| 3,898,627 | 8/1975 | Hooker et al. | 340/172.5 |
| 3,990,559 | 11/1976 | Martin et al. | 197/1 R |
| 3,991,868 | 11/1976 | Robinson et al. | 197/1 R |
| 3,996,585 | 12/1976 | Hogan et al. | 340/324 AD |
| 4,000,486 | 12/1976 | Schomburg | 340/172.5 |

*Primary Examiner*—Melvin B. Chapnick
*Attorney, Agent, or Firm*—James J. Ralabate; Franklyn C. Weiss; Ronald L. Taylor

[57] ABSTRACT

Interface circuitry for effectuating the control of a printing unit that employs a cursor moving in a scanning raster to effect permanent recordation on a laminar print media, such as paper. The interface circuitry includes a buffer storage unit for receiving high speed digitized signals designating characters to be printed. Corresponding video signals are accessed within the interface circuitry and are provided to the printer. The circuit elements and timing devices define a two dimensional matrix of area locations of uniform geometry. Video signals controlling the print characteristics in a row of area locations are accessed out of memory in the interface circuitry and are serially relayed to the cursor to produce a pattern of light and dark areas in a row within the field within which the character is to be printed. Provision of video signals in this manner is repeated until the video signals have been provided for all character positions through which that row passes. As the cursor in the printer steps to the next row, the circuitry of the interface unit likewise adjusts to access out patterns corresponding to sections of characters lying within the next row. The circuitry thus operates to build up the character representations layer by layer until an entire page is printed. Timing devices provide margins around the edges of the paper. Other portions of the circuitry upon appropriate command from the digital processor, operate to print caption information on the sheets of paper, which caption information is stored in the interface circuitry.

5 Claims, 14 Drawing Figures

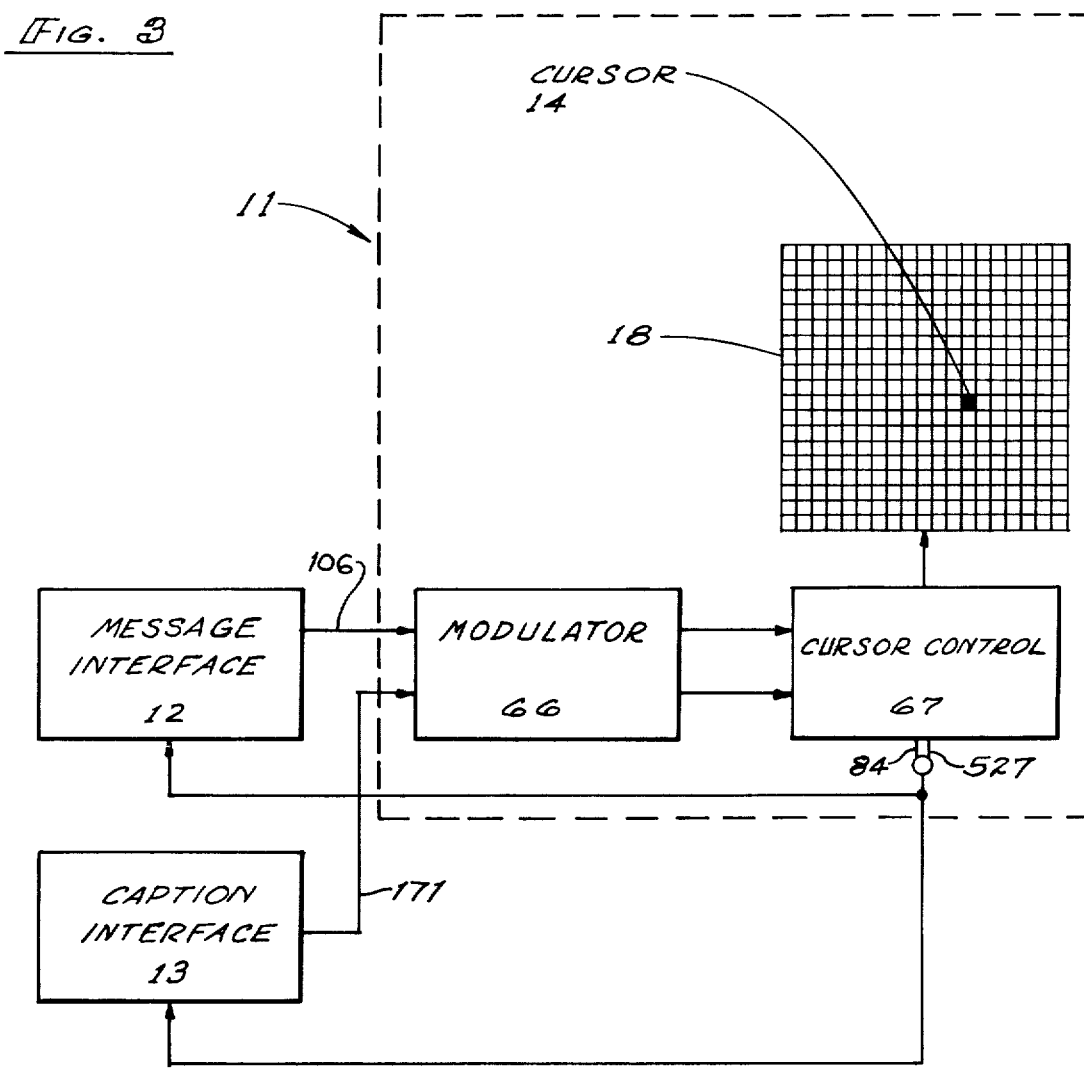

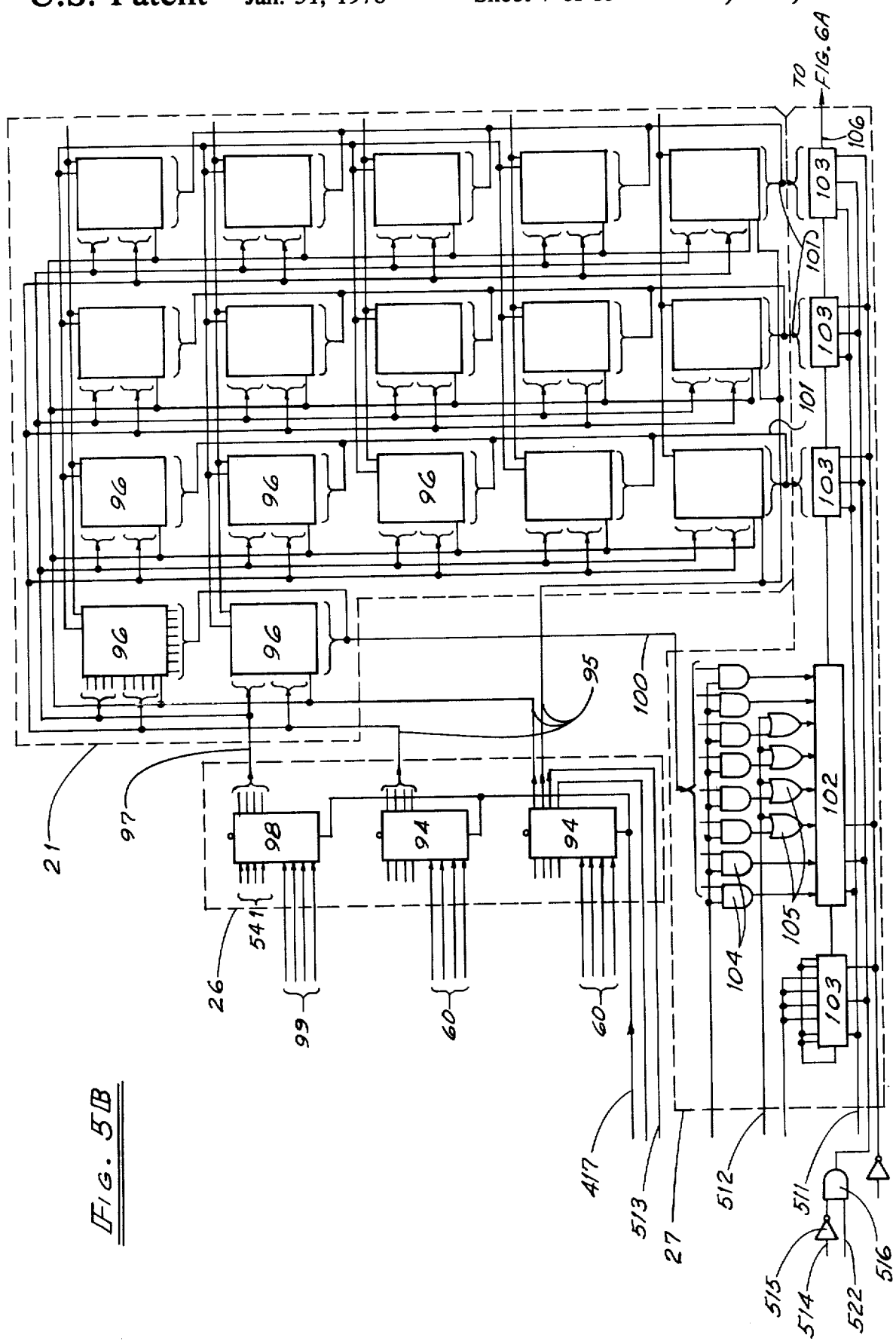

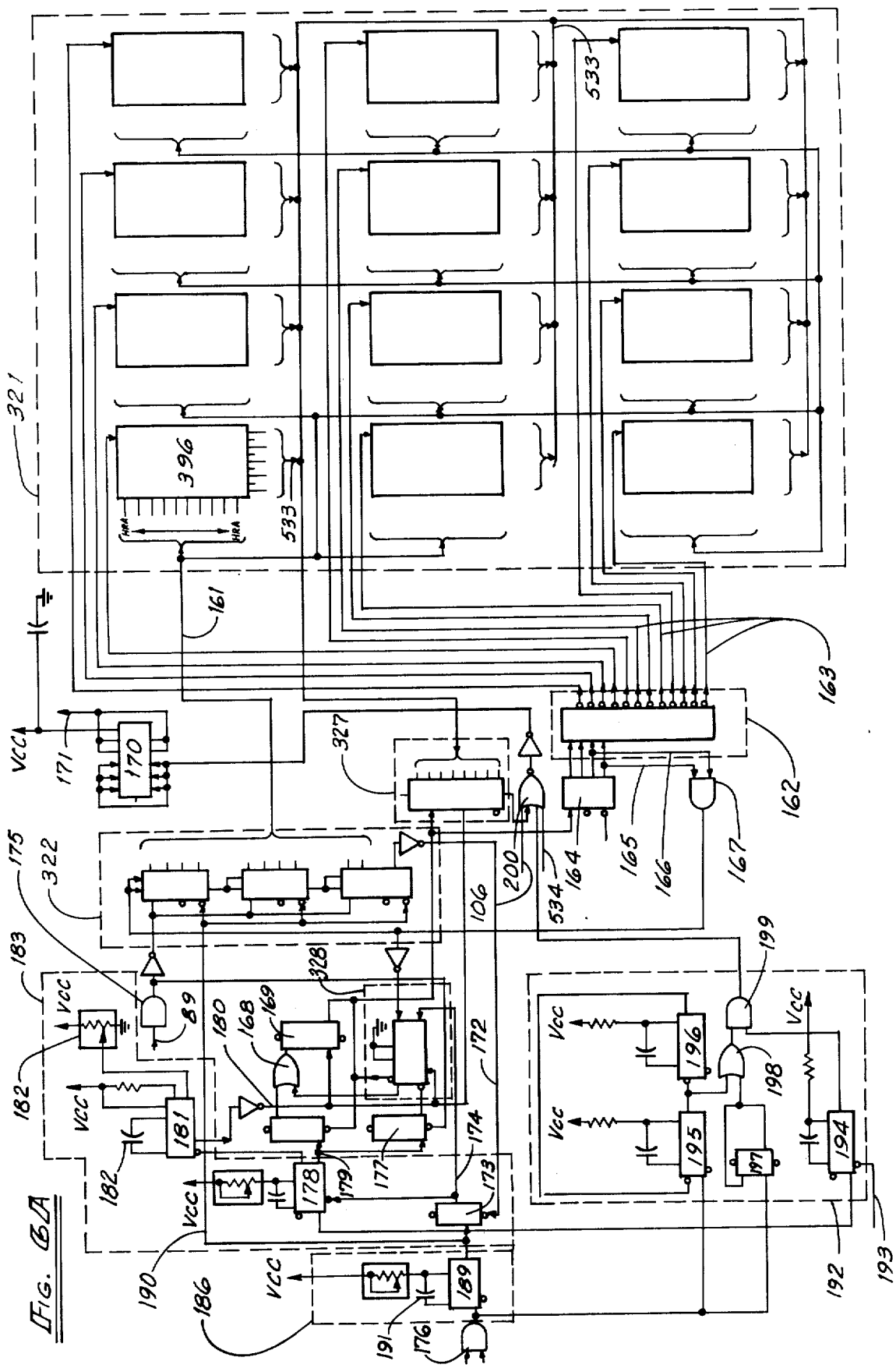

DIGITAL INTERFACE SYSTEM FOR A PRINTER

FIELD OF THE INVENTION

The present invention relates to those high speed information printing devices that utilize a cursor traveling in a raster to produce an image formed of light and dark areas on a record medium under the control of a digital processor.

BACKGROUND OF THE INVENTION

In the past, a number of techniques have been employed in order to provide a permanent record of an image from information existing as electrical signals. One popular technique employs a cursor, or beam of light, traveling in a raster across a record medium, and selectively creating light and dark spots on that medium the composite of which form visible images of character representations. This technique has been used in conventional copying machines.

While character generators of the type described have been operated under the control of a digital processor in the past, the extent of this control has been governed manually by an operator who is in a position to observe both the input to the digital processor and the output from it. However, unique problems arise when the input and output functions are not under centralized control. In such situations, for example in instances where data is to be transmitted from a remote location to produce an image on record media of the type described, conventional record transcription systems are likely to become overloaded and thus data will be lost. While the most apparent solution to this problem would be merely to increase the memory capacity and sophistication of the digital processor utilized, the necessary expense of the added data storage requirement and data processing capability is prohibitive for many printing installations. Accordingly, the present invention has been devised to allow data to be produced and directed to a printing mechanism without commonality of control of the data processor and the printing mechanism, and without requiring a high degree of digital processor involvement in the print operation. Pursuant to this objective, the concept of the interface apparatus of the present invention has been employed.

More specifically, it is an object of the present invention to provide a message interface for receiving message information in digitized form that is not maintained in a permanent digital memory, and to transcribe this information into a pattern of light and dark areas on a record medium to produce a visible record of the message.

A related object of the invention is to reduce the sophistication and the storage capacity necessary for programmed instructions to a digital computer, and also to reduce the requirement for storage capacity in the computer which must be utilized to accomodate the programming for the printing operation. Thus, the computer need not be programmed to store message data and arrange for it to be printed as a printer becomes available. In this way very large expenditures in software programming and requisite computer storage capacity are eliminated.

A further object of the invention is to provide an interface unit that only processes transient message information for recordation as an image in permanent form, but that also retains and reproduces in visible form recurring caption or header information. While the permanent record media utilized could be previously imprinted with caption information if only a single standard format of such caption information were to be required, there is presently no acceptable procedure for calling forth only one of several caption information formats which recur on a regular basis without dedicating a large block of computer storage capacity to this function. By utilizing the present invention, however, trigger signals from a digital processor result in the generation of a complete array of caption information from the interface unit.

A related object of the invention is to allow a plurality of particular subsets of caption information to be reproduced on a visible record medium without the requirement for computer programs to devise print format information or to select such information from computer memory.

DESCRIPTION OF THE DRAWINGS

FIG. 3 is a block diagram disclosing the operation of the print control system according to the invention in greater detail.

FIGS. 5A and 5B are designed to be positioned side by side to form a schematic diagram of additional portions of the interface apparatus depicted in FIG. 1.

FIGS. 6A and 6B are designed to be positioned side by side to form a schematic diagram of additional portions of the interface apparatus depicted in FIG. 1.

DESCRIPTION OF THE EMBODIMENT

Figure 4A:
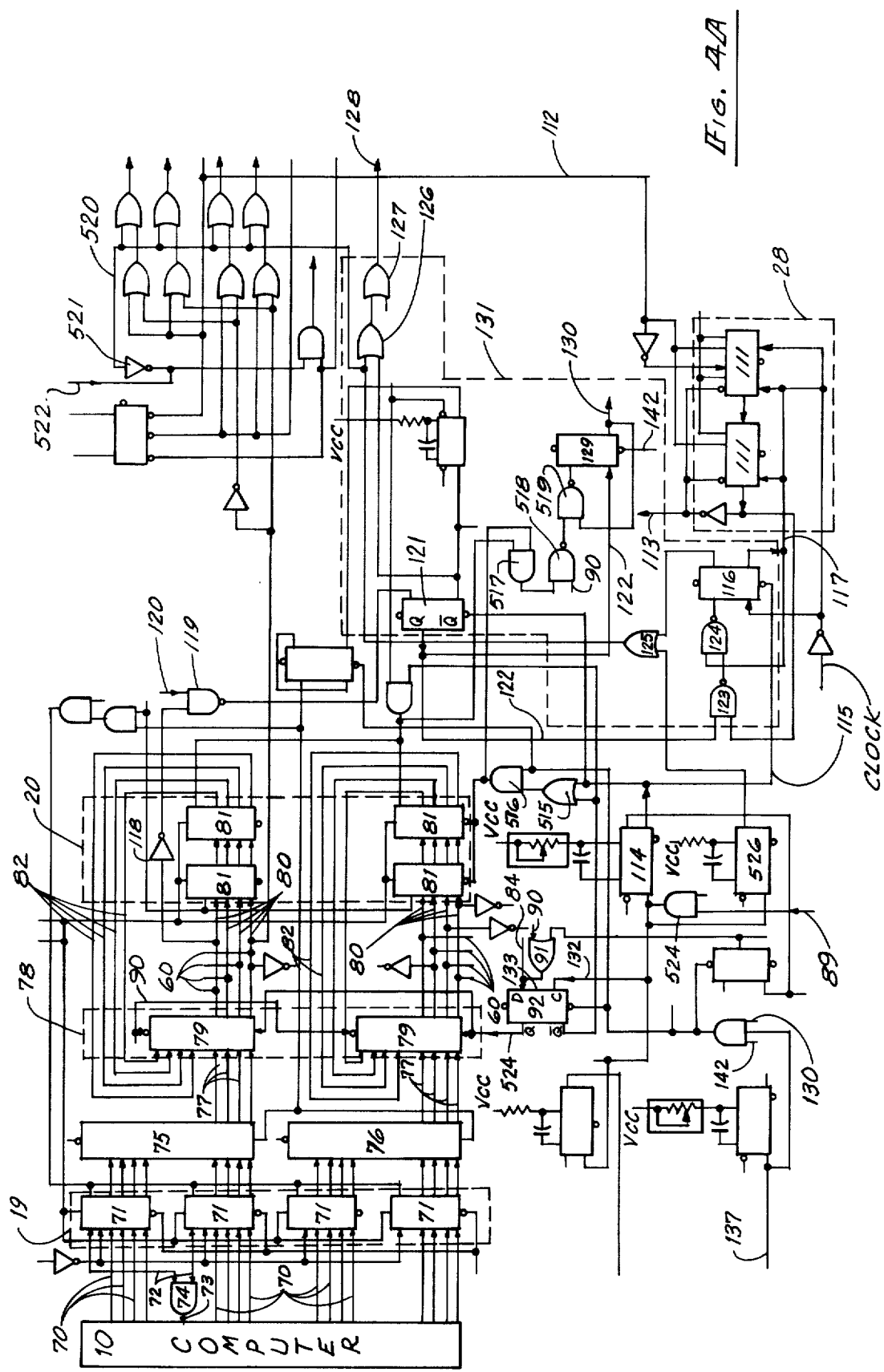
FIGS. 4A and 4B are schematic diagrams of portions of the interface units depicted in FIG. 1.

In the block diagrams a plurality of lines of common function in the detailed diagrams are represented by a single connection for the sake of clarity. For example, the plurality of lines 60 in FIG. 4A is represented as a single line 60 in FIG. 2.

Figure 1:
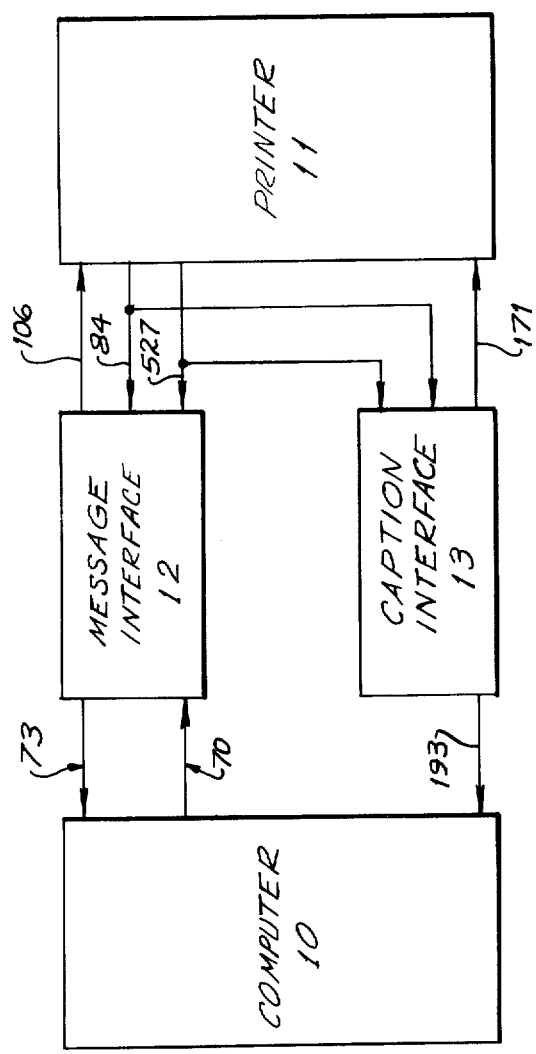
FIG. 1 is a simple block diagram illustrating the interconnection of interface apparatus with a computer and a printer according to the invention.
Figure 9:
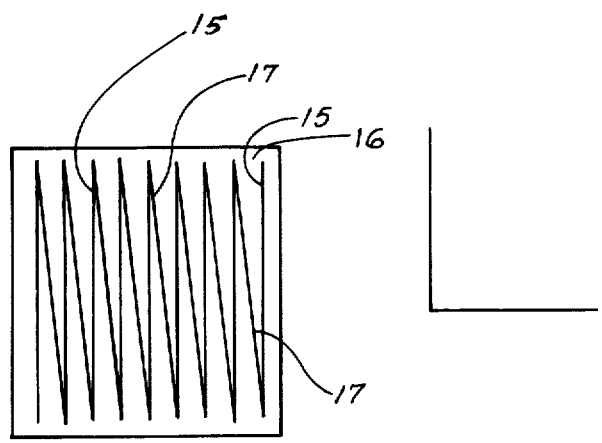
FIG. 9 illustrates the orientation of the cursor raster scan path.

With reference to FIG. 1, interface apparatus is illustrated as a message interface unit 12 or a caption interface unit 13. The message interface unit 12 is adapted to digitize message information from a computer 10 to a form suitable for use with a printer 11. The printer 11 is of the type that employs a cursor, as shown in FIG. 3, 14 to scan in a raster as indicated in FIG. 9 parallel to a first axis, such as the Y axis and to move relative to a second axis, such as the X axis for subsequent scans. In so doing, the cursor 14 travels along a series of parallel paths 15 parallel to the Y axis, and returns to a starting index 16 parallel to the X axis to begin each subsequent scan. The cursor 14 traces return paths 17 to step to the next subsequent scanning path 15. In this manner, the cursor 14 effects permanent recordation of print characters on a print medium 18, as in FIGS. 3 and 7, utilizing a predetermined plurality of scans parallel to the Y axis to produce each character. The elements of the laminar record print media 18 upon which the characters are produced are ordinarily sheets of paper.

Figure 2:
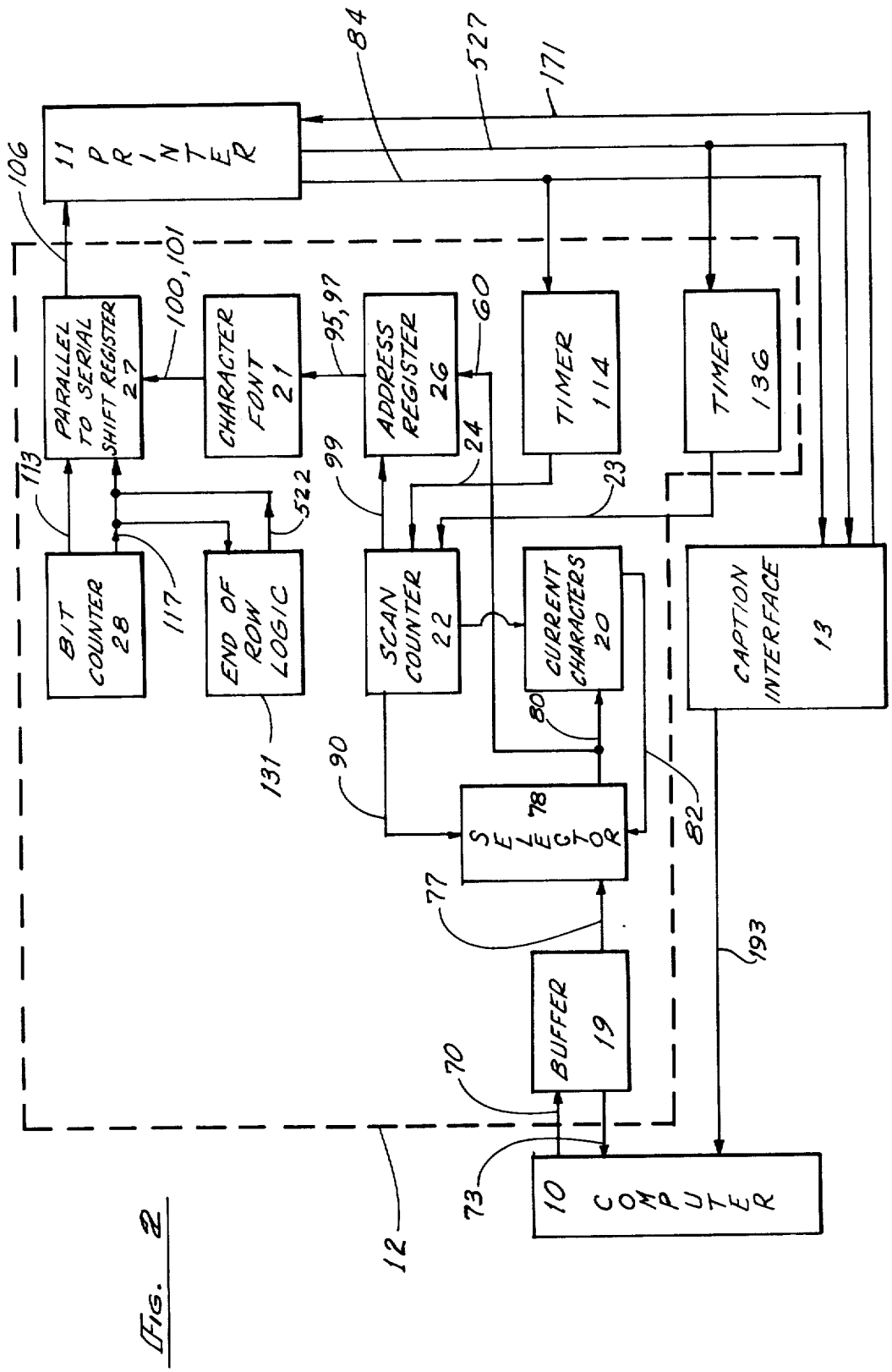
FIG. 2 is an expanded block diagram depiciting a message interface unit in some detail.

The interface apparatus 12, as shown in FIG. 2 itself employs a buffer storage register 19 for receiving digitized bits of encoded character representations from the computer 10. The buffer register 19 receives the digitized message data serially in bits and provides a signal back to the computer 10 to call for further message data to maintain a full storage capacity.

The message interface 12 also includes a current character storage register 20 for retaining bit representations of a plurality of characters next to be printed. The current character storage register 20 is connectable to receive message data from the buffer storage register 19 and includes lines 82 connected to form a recirculation loop for recirculating the message data bits therethrough. A memory storage means in the form of a character font 21 is provided for storing sets of video signals associated with particular characters in the character font of which the message information is comprised, and with particular scans in the plurality of scans 15.

A scan counting mechanism 22 is provided and is incremented and reset in response to separate actuating signals from the printer on lines indicated respectively as 23 and 24 in FIG. 2. The scan counter 22 provides a tabulation of the number of scans which have currently been counted. Scan counter 22 also provides an advance signal on line 25 to update the contents of the current character storage register 20 each time a predetermined count of scans is reached.

An address register 26 is connected to the memory storage unit 21 and to the scan counter 22. The address register 26 is sequentially responsive to the bit representations of current characters maintained by the current character register 20 and also to a current scan count from the scan counter 22. The address register 26 sequentially accesses sets of video signals from the memory storage unit 21 in response to addresses received. A shift register 27 is connected to the character font 21 for sequentially passing sets of video signals to the printer 11 as the sets of video signals are accessed out of memory storage by the address register 26.

To ensure transmission of the appropriate number of bits to the printer 11, a recycling bit counter 28 provides an actuating signal to the shift register 27 to effectuate transfer of the video signals to the printer 11 each time a predetermined count in the bit counter is reached.

Figure 7:
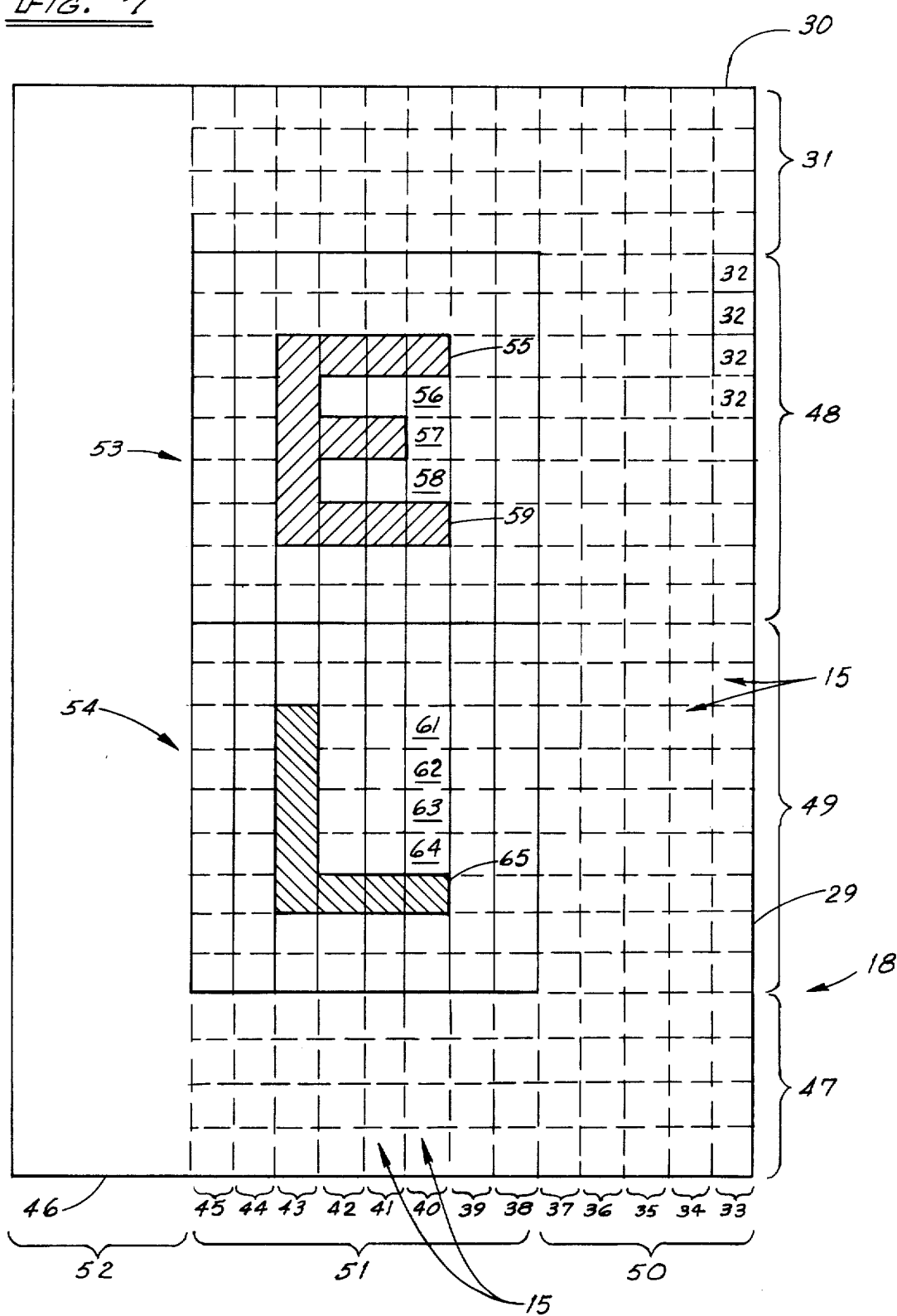
FIG. 7 is a diagram illustrating the manner of print control effectuated by the interface apparatus.

In the message interface apparatus 12 of FIG. 2, the memory storage device 21 stores video signals that are indicative of the patterns of relatively light and dark areas in linear sections at uniform row intervals through visual representations of characters in a character font of which the message information is comprised. That is the scans of the cursor 14 across the record medium 18 in FIG. 7 are initiated proximate to and parallel to the edge 29 of the record medium 18. The cursor 14 begins moving along its first scan path 15 at the upper edge 30 of the record medium and proceeds lengthwise parallel to the edge 29. A margin 31 adjacent to the edge 30 is a highly desirable feature in connection with the imaging of message information. The mechanism for forming the margin 31 will be described in detail herein, but the overall function of the margin is to provide a strip across the top of the paper 18 adjacent to the edge 30 within which message information will not appear.

After leaving the margin 31, the cursor 14 encounters the first of a predetermined number of area locations 32 in the first row 33 of area locations. Each of the rows 33 through 45 contains the same predetermined number of area locations 32, and each area location 32 is of uniform geometry Thus, the cursor 14 scans in a raster along a raster path 15 sequentially traversing each of the parallel linear rows 33 through 45 from the upper edge 30 of the paper 18 to the lower edge 46 thereof. After traversing a row, the cursor 14 moves in stepwise fashion in a raster return path 17 as indicated in FIG. 9. The cursor 14 then traverses the next subsequent row. The rows 33 through 45 are located a uniform distance apart as indicated in FIG. 7.

Between the upper margin 31 and the lower margin 47 on the paper 18, the area locations 32 within each row are arranged in fields, indicated as 48 and 49 in FIG. 7. Each of the fields within a row has the same plural number of sequential area locations 32 and is aligned with similar fields in adjacent rows.

The rows themselves are also arranged in groups. Following an initial margin 50 along the right-hand side of the sheet paper 18, the rows 38 through 45 comprise a group of rows 51 which define a width of space within which a visual character representation, if any, must wholly lie.

It is to be understood that the selection of the number of area locations per row, the number of area locations in a field, the number of fields within a row, and the number or rows within group is arbitrary. To simplify the illustration and explanation of printing and message information storage and coding, only 18 area locations have been depicted in each of the rows 33 through 45 between the margins 31 and 47. Thus, there are nine area locations in each of the two fields 48 and 49. The eight rows (38 through 45) define the single row grouping 51 between the right and left-hand margins 50 and 52. As indicated, this small number of area locations per field, number of fields per row, number of rows per row grouping, and number of groups per page are considerably less than would be desirable in an actual printer. However, by depicting the row, group, field and area location format as in FIG. 7, the explanation of the invention is facilitated. In actuality for upper case characters, suitable parameters for printing on 8 ½ by 11 inches sheets of paper involve the utilization of 60 of the area locations 32 within each field, 43 fields between upper and lower margins per row, 30 area locations in each row grouping, and 72 row groupings per sheet of paper 18.

One of the advantages of the interface apparatus of this invention is the enhanced flexibility which it provides without requiring extensive computer programming or computer memory storage. Therefore, in addition to the upper case characters with the parameters as described, the system also allows other character styles, such as medium size and small characters, to be printed. The medium size characters preferably involve 26 rows within a grouping, and 52 area locations within a field while the small characters might employ 15 rows within a grouping and 30 area locations in a field. The selection of the particular style of character is controlled through the use of only two bits of information from the central processor to the interface unit.

The number of area locations per field and the number of rows within each row grouping allow spatial areas to be defined within which an image representation of a character is to be printed. These spatial areas are indicated at 53 and 54 in FIG. 7, and each of the spatial areas is a matrix nine area locations long and eight area locations wide. It should be noted that the overall length of the spatial area 53 is controlled by the length of each of the area locations 32 while the overall width is controlled by the width of the area locations 32. The length and width of the area locations 32 need not be equal, but must be uniform from one area location to another.

In imprinting characters within the spatial areas 53 and 54, it is advantageous to provide margins within each of the spatial areas. Thus, the entire character configuration must be printed within the limits defined by the margins. Each of the margins in the spatial areas 53 and 54 is measured by the appropriate dimension of two adjacent area locations 32. That is, the upper and lower margins are each equal to twice the length of an area location 32, while the left and right hand margins are each equal to twice the width of an area location 32. Thus, the information stored in the character font 21 will in every instance include data bits that will cause the cursor 14 to leave the first two and last two area locations within each field blank. Similarly, the data bits in the character font 21 will cause the cursor 14 to leave the first two and last two rows in each row grouping blank. The area within which a character may actually appear is a 5 by 4 matrix of area locations 32. The memory storage unit 21 stores video signals indicative of the patterns of relatively light and dark areas in linear sections at uniform row intervals through the visual representations of the characters in the character font of which the message information is comprised.

For example, in association with the character "E"- the video signals stored in the memory storage unit 21 that are first accessed out to print the character are signals which cause the cursor to first create a darkened area at 55, to next leave 3 undarkened areas 56, 57 and 58, and to then create a second darkened area 59 in the raster scan along row 40. The margin information requiring undarkened areas to appear in the first two area locations in field 48 and in row 40 and in the last two area locations in field 48 in row 40 arise by virtue of the font selection signal from the computer, and need not be separately accessed from the character font 21 since these marginal spaces are common to all characters in that font.

In continuing along the row 40, the cursor 14 departs from the field 48, and then leaves undarkened the first two area locations comprising the upper margin in field 49. The cursor 14 then enters the 4 by 5 matrix in which light and dark areas appear in a pattern associated with a subsequent character to be printed. The subsequent character is selected and video signal information accessed from the character font 21 in association therewith in response to a character field signal that occurs at the termination of field 48. The character field signal is a signal from scan counter 22 to the current character register 20 on line 25, and occurs in timed synchronization with the entry of the cursor 14 into each new field that it traverses. Thus, a character field signal occurs as the cursor 14 enters the field 48 and again as the cursor enters the field 49 in traversing the raster path 15 associated with row 40.

As a result of the occurrence of the field signal, the current character register 20 advances the recirculating character codes by one character so that the next subsequent character is transmitted on lines 60 to the address register 26. This causes the address register 26 to access the next subsequent character from the character font 21. In the example depicted in FIG. 7, this next subsequent character is the letter "L". The video signals accessed from within the character font 21 influence the cursor 14 to leave the area locations 61,62,63 and 64 undarkened, and to darken area location 65. As the cursor 14 proceeds along row 40, it next is subjected to the video signals calling for a margin, which require that the last two area locations in field 49 remain blank.

The cursor 14 at this point in time has completed the production of relatively light and dark areas which correspond to linear sections through the letters "E" and "L" at the right hand extremity of those character representations, ie; a linear section along row 40. The cursor 14 is next stepped to the next subsequent row 41 while it is being returned to the upper edge 30 of the sheet of paper 18, thereby traveling in a path 17. During the return, it is not actuated to create any darkened areas on the paper. The cursor 14 then proceeds along the row 41 from the upper edge 30 to the lower edge 46 of the paper 18 printing darkened area locations and leaving undarkened area locations corresponding to a subsequent section or slice through the letters "E" and "L" a row interval distant from the first section. Thus, the entire visual representations of these letters are built up one row interval at a time. As the cursor 14 is stepped to each subsequent row, the modulator 66 in FIG. 3 acts upon the cursor control 67 to call patterns of video signals from memory storage 21 and reproduce various ones of the stored patterns to complete the remaining sections of the character representations "E" and "L".

The specific structure and manner of operation of the invention may be explained with greater clarity and particularity by reference to FIGS. 4A, 4B, 5A, 5B and 6A and 6B. The interface apparatus of the invention serves as a means for modulating and controlling message information received from a data processor or computer 10 for use in operating a printer 11. Prior to the text of each message, the computer transmits to the message interface unit certain control information. This control information is received at terminals 67, 68 and 69 in FIG. 5A. Since there are three control lines, eight different control selections may be specified by inputs on these lines. Among the information specified is the font selection of large, medium or small characters.

The message information itself is transmitted to the message interface unit on lines 70 in FIG. 4A where it is received in buffer registers 71. The memory capacity of the buffer registers 71 is 128 characters, since in the preferred embodiment eight bits are required per character. Message data bits are loaded into the front end buffer until it is full at which time the input ready lines 72 deactuate the AND gate 74 so that AND gate 74 no longer calls for more character bits from the computer 10 on line 73. The buffer storage device 19 thereby provides a means for receiving the digitized message data serially in bits on lines 70. The buffer 19 also provides, through the AND gate 74, a signal to call for further message data to maintain a full storage capacity.

Data latches 75 and 76 are provided to receive the message data bits from the buffer registers 71 and the buffer store 19. The message data bits are thereafter transmitted on lines 77 to a selector 78 which includes two IC chips 79. The selector 78 may pass the bits from the front end buffer 19 on lines 80 to the current character register 20 which is comprised of four different IC chips 81. Alternatively, the selector 78 may pass the data contained in the current character register 20 back through the recirculation lines 82 where the selector chips 79 may choose to recirculate the data from lines 82 back onto lines 80. If, however, a row group has been completed, the selector chips 79 instead block and discard instead the data from lines 82 and select instead the incoming data from the data latches 75 and 76 transmitted on lines 77. The selection in this regard is controlled by the scan counter 22 which transmits its command on line 90.

Figure 4B:
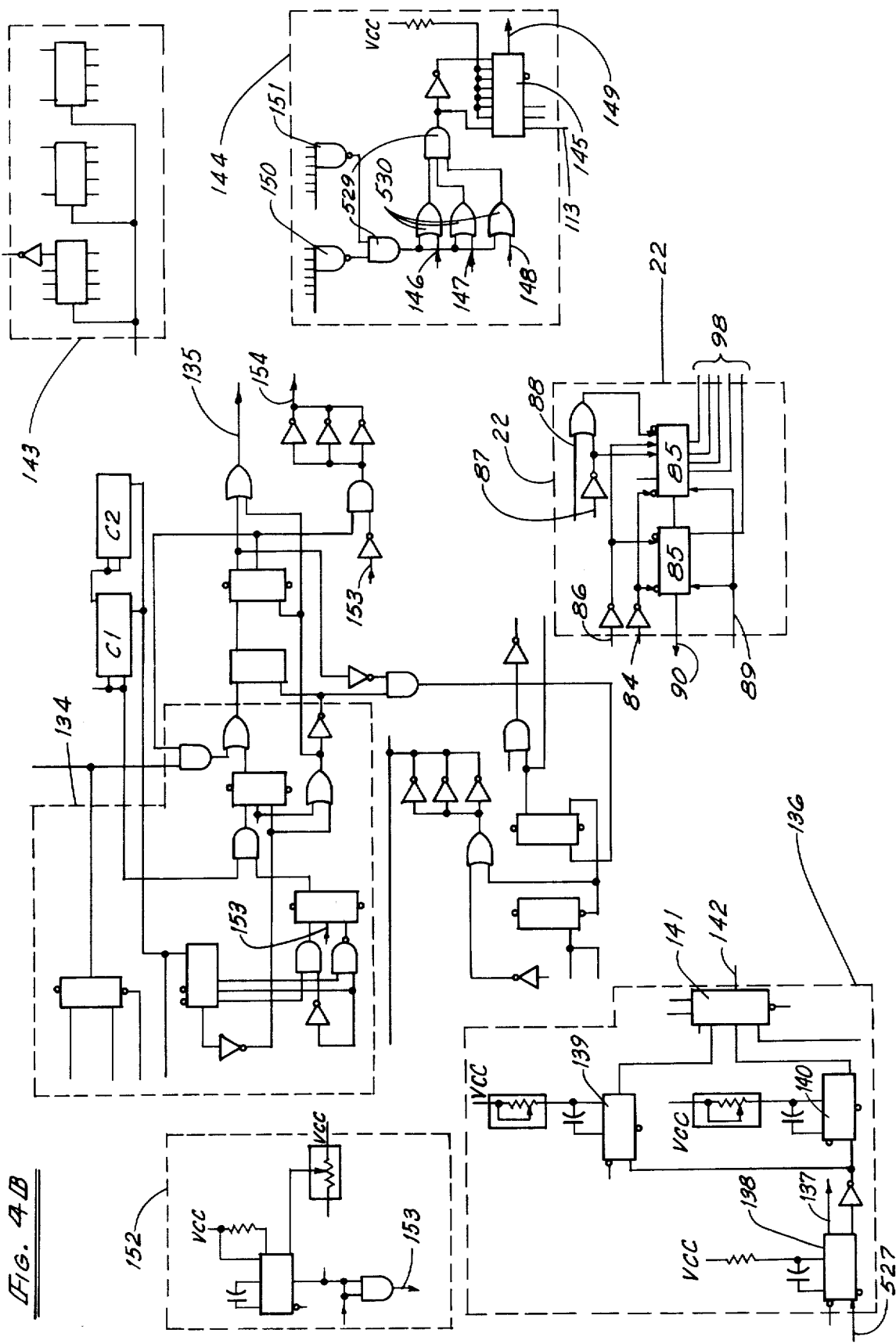

The scan counter 22, depicted in detail in FIG. 4B, received a signal on line 84 loading a predetermined initial count value into the scan counter registers 85. This initial scan count value is determined by inputs on lines 86, 87 and 88 which are respectively associated with the large, medium, and small character sizes and with sections in the character font 21 corresponding thereto. Once the initial scan value has been loaded into the scan registers 85, the registers 85 react to scan sync pulses on line 89 to count up to the initial value. The scan sync pulses are treated as clock pulses in the registers 85. Upon reaching the initial value loaded into the scan counter 22, the registers 85 generate a final scan signal on output line 90. This final scan signal is passed to an OR gate 91 in FIG. 4A which in turn causes the flip flop 92 to change state The Q output of the flip flop 92 resets the selector chips 79 causing them to gate through signals on the lines 77 carrying new character codes to the exclusion of the signals on lines 82 carrying the recirculating character codes. Thus, signals corresponding to the new characters to be printed next are transmitted to the address register 26 on lines 60.

The selector 78 is connected between the buffer register 19 and the current character register 20 and is also connected in the recirculation loop lines 82. The selector 78 thereby alternatively gates through message data bits to the current character store 20 on common connecting lines 80 either from the buffer store 19 or from the recirculation loop lines 82. As the message data bits are transmitted from the selector 78 to the current character store 20 on lines 80 they are sampled on lines 60 and are transmitted to the address register 26.

The address register 26 includes code conversion units 94 two of which receive the digitized message character codes on lines 60 as illustrated in FIG. 5B. These digitized codes are of some conventional computer compatible code, such as the ASCII code which is used extensively in digitally controlled printing. The code conversion units 94 convert the ASCII code to enabling signals which are transmitted on lines 95 to selectively enable ones of a plurality of memory chips 96 and selected storage locations therein in the character font 21 that serves as a memory storage device. The selective enablement of outputs from memory chips 96 is further restricted by the outputs on line 97 from a selector chip 98 within the address register 26. These outputs on lines 97 are controlled by inputs to the selector 98 on lines 99 from the scan counter 22 if the unit has been actuated to receive message data.

The specific memory location addressed within the character font 21 when enabled by inputs on the lines 95 and 97 produce outputs on the lines 100 and 101. Thus, the memory elements 96 in the character font 21 store video signals associated with the characters in the character font of which the message character code bits appearing on the lines 60 are comprised. The address register 26 is connected to the memory storage unit 21 and to the lines 60 for sequentially addressing video signals from some of the locations in the memory storage unit 21. The locations are addressed sequentially and correspond to character representations in the message data appearing on the lines 60.

The output lines 100 and 101 are connected to the shift register 27 which includes shift register modules 102 and 103. The signals on lines 100 are transmitted to AND gates 104, some of which in turn are connected to OR gates 105. The AND gates 104 and OR gates 105 are provided to control the input to the shift register module 102 depending upon the character size — large, medium or small. The character size controls the number of area locations which must be left blank in each field such as the fields 48 and 49 in FIG. 7, to provide a margin about the matrix in which the darkened and undarkened area locations are to be printed. The contents of the shift register modules 102 and 103 are entered in parallel from the character font 21, and are serially transferred out from left to right in FIG. 5B on line 106 to the printer 11. Each of the shift register elements 102 and 103 is an eight bit parallel — in/serial out shift register chip.

Figure 5A:
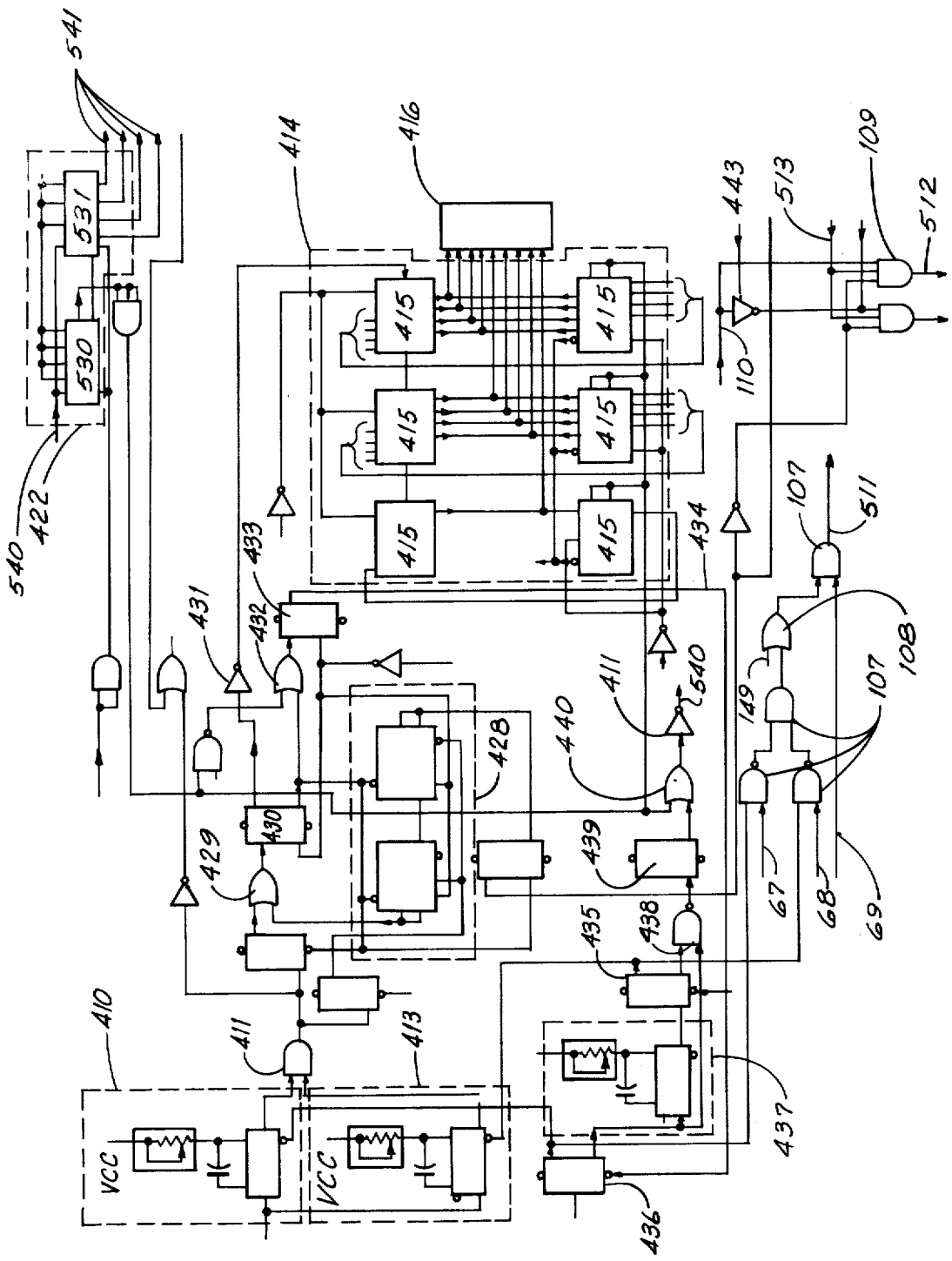

Loading of the shift register chips 102 and 103 is achieved through a shift/load input ultimately derived from the digital control pulses from the computer 10 on input lines 67, 68, and 69 in FIG. 5A. These digital control pulses act through AND gates 107 and OR gate 108 to provide a shift/load signal on line 511. The shift register module 102 receives inputs through the OR gates 105 either from the lines 100 emanating from the memory storage units 96 on line 512 or from AND gate 109. AND gate 109 is in turn enabled by a signal on line 513 from the address register 26 and by a signal on lead 110 which indicates that the small size characters are to be printed, as opposed to large or medium size characters.

The shift register 27 is thus connected to the memory storage 21 for concurrently receiving therefrom the video signals associated with the portion of selected character representations to be recorded on the record medium 18 in the current scan of the cursor 14. The shift register 27 transfers these video signals to the printer 11 under the control of a bit counter 28 to effect permanent recordation of a portion of the selected character on the laminar record medium 18. The record medium 18, usually paper, must be of predetermined dimensions so that actuation of the cursor to darken or leave undarkened area locations 32 is coordinated with the desired margins on the paper 18.

The bit counter 28 which is depicted in detail in FIG. 4A includes two counting chips 111, one feeding into the other. An input at 112 and the interconnection of the input leads between the two counting elements 111 establishes the overflow level which results in an output signals on line 113. This output signal acts as a trigger for the shift register 27 and causes all of the video signals stored in the shift register 27 to be transferred out to the printer 11 each time a predetermined count is reached. Thus, the recycling bit counter 28 periodically provides an actuating pulse to the shift register 27.

The output on line 113 appears as an input to circuit 144 in FIG. 4B which in turn produces a shift register load enable output on line 149 that supplies on input to an OR gate 108. A clocking input to the shift register 27 is provided on line 522 from FIG. 4A to AND gate 516. The other input to the AND gate 516 is a clock pulse on line 514 passed through an inverter 515. The resultant output of AND gate 516 triggers the shift register 27.

As the cursor 14 advances serially through the fields 48 and 49 of the rows 38 through 45, the video signals act upon the cursor to cause it to darken or leave undarkened area locations 32 within each row. When the cursor 14 reaches the end of a row, it generates a sync signal which is received by the scan counter 22 on line 89. This increments the scan counter by a count of one and indicates to the scan counter the advancement of the cursor 14 in the printer 11 through an entire scan 15.

The scan sync signal also acts through line 89 as an input to a flip flop 114. Flip flop 114 has an output 115 which resets another flip flop 116 which, through an output 117, acts as an actuating signal to the bit counter 28 to reactuate the bit counter 28 if it has been disabled due to the receipt of a video last character bit in the coded character representation from the computer 10. This video last character bit is a dedicated bit which is low for all characters to be printed except the last character in each of the rows in columns 38 through 45. The occurrence of a video last character bit is sensed on one of the lines 60 and acts through an inverter 118 to trigger a NAND gate 119 in synchronization with a timing signal derived on line 120 from the computer 10. The NAND gate 119 triggers a flip-flop 121 the Q output of which generates a video last character signal. The video last character signal is carried on line 122 to AND gates 123 and 124, through which it reverses the state of the outputs of flip flop 116 and disables the bit counter 28. This disablement will only occur as the bit counter 28 clocks out an actuating pulse to the shift register 27, since the uninverted form of that actuating pulse is required to provide one of the gating inputs to NAND gate 123.

When the flip flop 116 is actuated by the video last character signal, it produces an output to OR gate 125 which acts sequentially through OR gates 126 and 127 to provide a reload signal on line 128. This signal is transmitted to the computer 10 which responds by providing a signal to shift register 27 at line 69.

The video last character signal on line 122 also operates the flip flop 129 to produce an inhibiting output at 130 which is only reversed when OR gate 515 and AND gate 516 cause the AND gate 517 and the NAND gates 518 and 519 to change the state of flip flop 129. Also, when the last video character signal acts upon flip flop 116, the Q output of flip flop 116 goes low. This removes an input from OR gate 125. The output 520 of OR gate 125 is inverted by inverter 521 and in turn removes an actuating input 522 from the shift register 277. This inhibits operation of the shift register 27. In this way, the end of row logic 131 serves as a transfer inhibit means. Because the inverter 118 is connected to a selected one of the lines 60 through a selected one of the lines 80, the transfer inhibit means 131 is able to respond to message data bits indicative of the last character to be printed in a row parallel to the edge 29 of paper 18.

The scan sync signal on line 89 not only causes the flip flop 114 to change state through circuit element 524, but acts upon the C input 132 of flip flop 92 to ensure that the Q output of the flip flop 92 remains low until or unless flip flop 92 is reversed through the OR gate 91 or through the initial loading signal on line 133. As previously explained, a signal on line 90 indicates that the final scan has occurred within a row grouping, so that new characters should next be printed. This will cause the line 524 to go high and thus gate in to the current character register 20 new character codes from the buffer register 19. The circuit 132 additionally pulses a flip flop 526 to ensure an output from OR gate 125.

Also present in the system is a circuit arrangement 134 depicted in FIG. 4B for detecting a computer signal that the text of a message is complete and for signaling this condition to the computer 10 on line 135. This interrupt signal will notify the computer 10 that the message interface unit 12 is available to accept further messages.

The circuit 136 in FIG. 4B is used to generate the initial side margin 50 for the text of the messages. That is, as each sheet of paper leaves the printer a page mark signal is generated within the printer on line 527. This page mark signal acts upon flip flop 138 to produce a page sync signal on line 137 that indicates the departure of a sheet of paper 18 from the print area. The page mark signal on line 527 acts upon the flip flop 138 to cause outputs to flip flop 139 and 140. Each of the flip flops 139 and 140 is biased to a different extent so that the flip flop 139 generates an output pulse 60 milliseconds after receiving an input pulse while flip flop 140 generates an output pulse 90 milliseconds after receiving an input pulse. The one of four data selector 141 selects the signal from either flip flop 139, where it is desired to print large characters, or the signal from flip flop 140 when it is desired to print the small or medium size characters. The output of data selector 141 is provided as a text margin signal on line 142.

The circuit 143 in FIG. 4B is interface circuitry with the computer 10 for internally actuating appropriate leads depending upon the mode of operation selected. The different modes of operation include the selection of the message interface modulator controller 12, or one of several caption interface modulator controllers 13, hereinafter to be described.

One further feature of the message interface circuit 12 is the circuit indicated at 144 in FIG. 4B. This circuitry is comprised of a series of AND gates 529 and OR gates 530 which act through an eight bit parallel-in/serial-out shift register 145. This circuit is actuated in response to different inputs at 146, 147 and 148, corresponding to the small, medium and large print character sizes. In response to the selected input, the timing of the load signal 149 is varied as an output to alter the times at which the video signals associated with the print characters "," and ";" are printed out. This is done to delay slightly the actuation of the cursor 14 in response to a command to print these characters, since it is desirable that the characters appear slightly lower in the print fields 48 and 49 than the other characters of the character front. Thus, receipt of actuating inputs at NAND gate 150 corresponding to the ASCII code selection of a comma will produce a delayed output at 149. By the same token, receipt of the ASCII code corresponding to the character ";" at NAND gate 151 will likewise produce a delayed output at 149.

The circuit indicated at 152 in FIG. 4B is merely an oscillator circuit that provides a 750 kilohertz squarewave output at 153. This output 153 serves as an internal clock pulse input at various locations within the modulator controller 12. One of the resulting clock outputs produced in response to the signal at 153 is the output at 154 which, along with the output at 135, are transmitted to an adapter unit within the printer 11 to ensure synchronization between signals emanating from the message interface 12 and signals generated internally within the printer 11.

Figure 10:
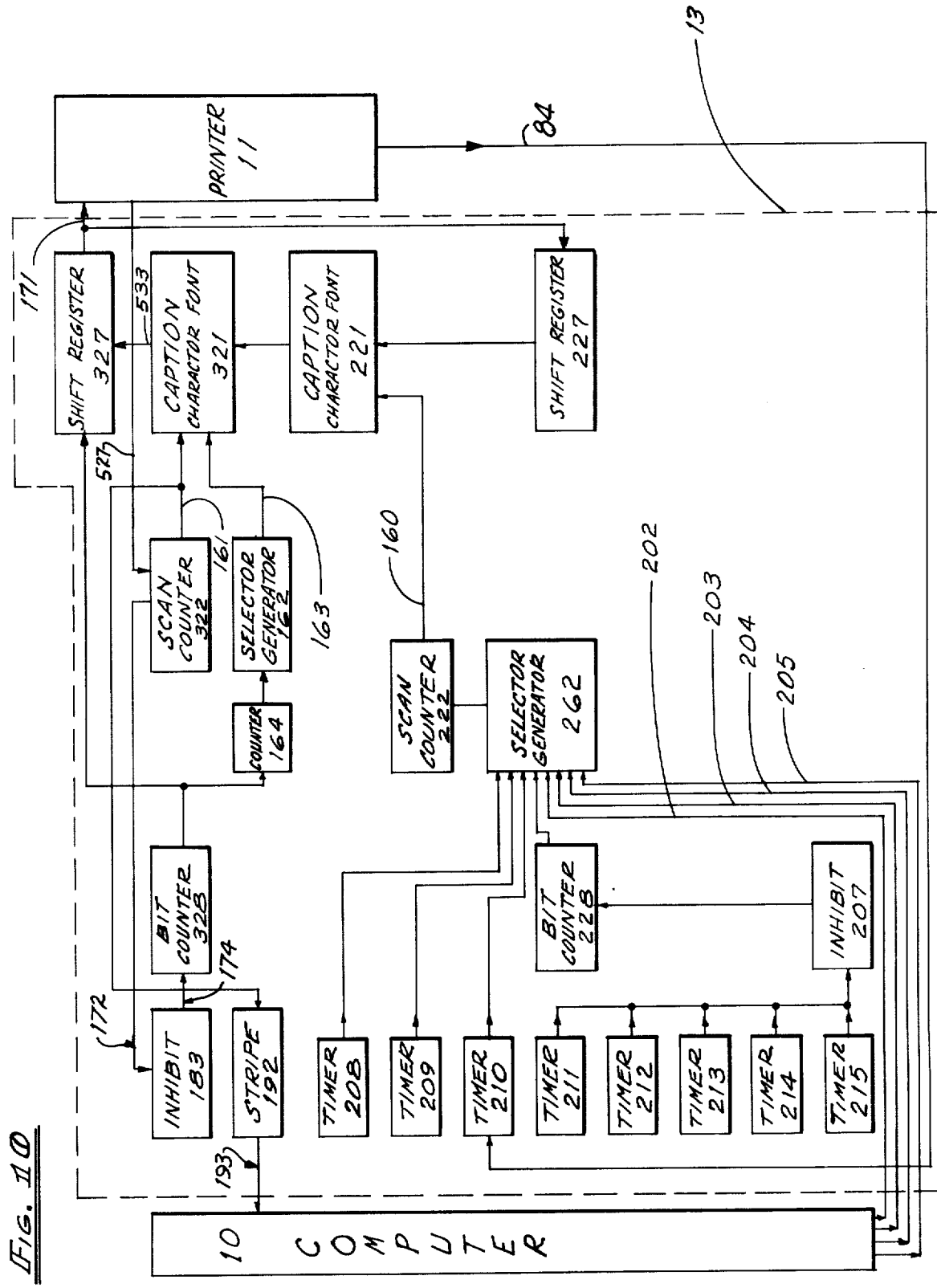
FIG. 10 is an expanded block diagram depicting a portion of the caption interface unit of FIG. 1 in some detail.
Figure 11:
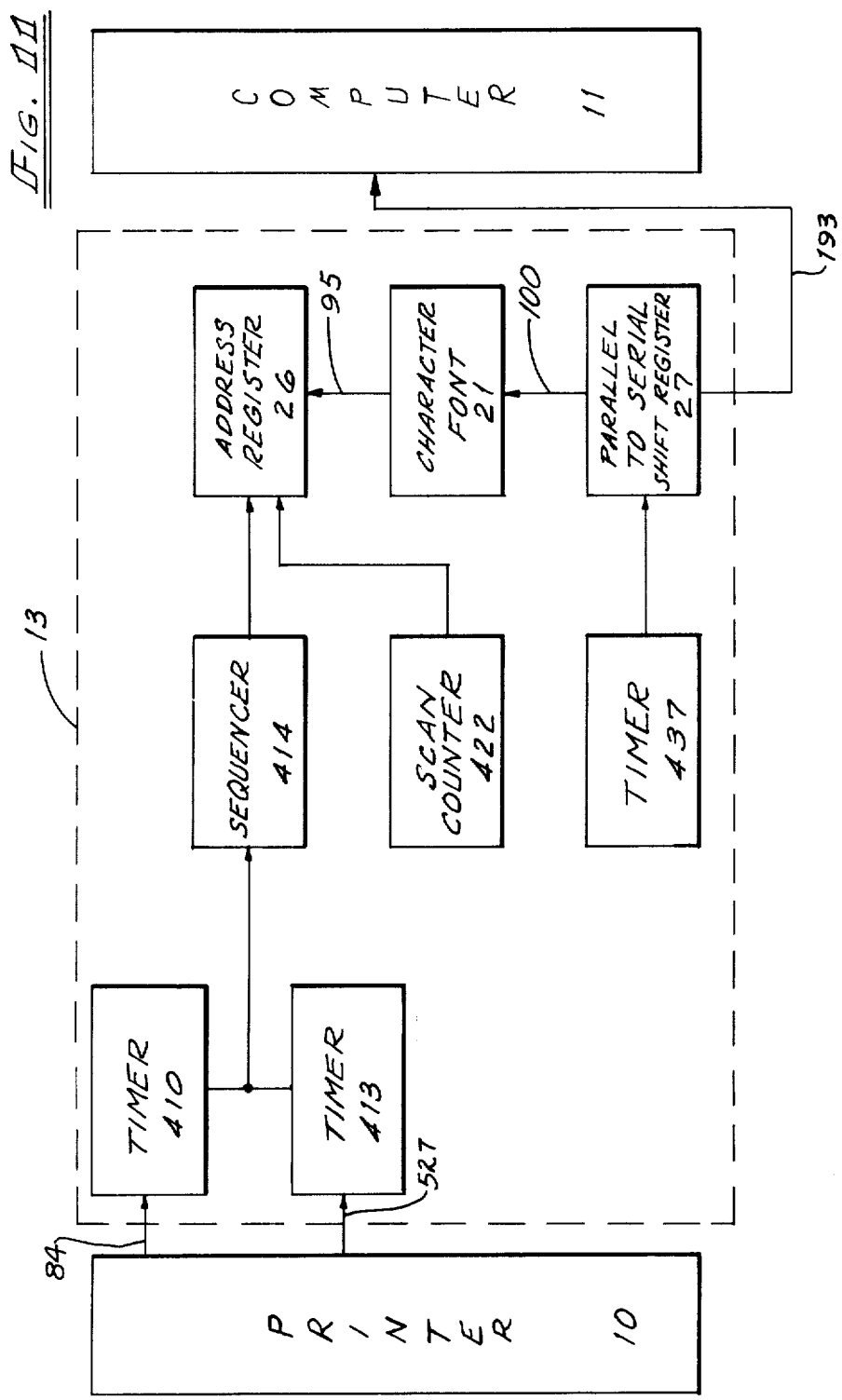
FIG. 11 illustrates another portion of the caption interface unit of FIG. 10.

The equipment organization of the caption interface unit 13 is quite similar to that of the message interface unit 12 and is illustrated in block form in FIGS. 10 and 11. The principal difference between the organizational operation of the caption character interface unit 13 and the message interface unit 12 is that only nine different control bits from the computer 10 are necessary in order to effect the entire print operations associated with several different caption information items. For example, only one control bit is required to print the routing block 155 in FIG. 8. Likewise only one control bit is required to print the series of stripes across the top of the paper 18 and one control bit is required to effect printing of the letters "EXDIS", an abbreviation for executive distribution. One control bit likewise is required to print the designation "OUTGOING TELEGRAM" or an alternative designation "INCOMING TELEGRAM". Three control bits are required to print the classification designation, which in FIG. 8 appears as "LIMITED OFFICIAL USE" both at the top and at the bottom of the paper 18. Incident to this classification designation is the designation at 157 indicating "NOT TO BE REPRODUCED WITHOUT AUTHORIZATION OF THE EXECUTIVE SECRETARY". Two control bits are required to select the particular memory storage area from which caption character video signals should be selected. No control bits are required to effect printing of the designation of the administrative energy or other entity within which the message is promulgated, such as the designation "DEPARTMENT OF POWER" at 158, it being envisioned that the entire message system is to be used within a single such organizational body.

Because of the recurring nature of the information to be printed, there are no message characters as such from the computer 10 that are utilized in the caption interface unit 13. Rather, the control bits merely actuate the selection and imprintation of the appropriate caption information on the paper 18.

The caption interface device 13 utilizes a caption storage means in the form of caption character fonts 221 and 321. These caption character fonts are each comprised of memory storage chips 296 and 396 respectively. The caption storage means 221 and 321 store video signals indicative of caption section patterns of relatively light and dark area in linear sections at a uniform interval through various visual representations of different size of printed characters. That is, video signals are sequentially available to produce print in a vertical slice through a letter or number, similar to the slice traced through the letter "E" by any one of the rows 38–45 in FIG. 7. It is to be understood that the pattern traced might vary from that produced in FIG. 7 because of a desire to alter the character height or print style.

The various characters to be produced are selected from the same characters that are stored in the character font 21. The dimensions of the representations of these characters are different, however. That is, for example, the number of area locations 32 in each of the fields for each of the characters, including the character "E", in the caption "EXDIS" at 159 is different than the number of area locations in the field 48. Similarly, the number of rows or scans required to create those characters indicated at 159 is different than the number of rows in the row grouping 51 in FIG. 7.

By the same token, character representations of still different dimensions are utilized to form the characters in the captions indicated at 155, 157 and 158. Thus, although the characters produced in the character representations are the same as those utilized in the message text, the dimensions, and in the case of the caption at 158, the configuration are different.

As with the message character representations, it is necessary to provide caption character field signals each representative of sequential caption character fields of a preselected plural number of the area locations 32 in each linear row formed by a series of the area locations 32 in a single scan 15. As with the message interface unit 12, the means for providing field signals is a scan counter means, such as the scan counters 222 and 322 respectively associated with the caption character fonts 221 and 321 in FIG. 10. Unlike the scan counter 22 which is required to act through the address register 26 in order to convert an ASCII code to a data address, no such code conversion is required in the caption interface 13. Rather, the scan counters may be connected directly to their associated character font since only predetermined desired character organizations are necessary to produce the caption designations such as the designations 155, 157, 158, 159 and 201. Because of the desirability of minimizing the required electrical connections, a scan counter 422 in FIG. 5A is connected through the quad one-of-two data selector 98 in the address register 26 for the purpose of accessing video signals associated with the character displays 155 and 157, which are stored in the memory storage unit 21 along with the message character video signals. The scan counter 422 includes counter elements 530 and 531. The scan counters 222 and 322, however, are not passed through an address register but are connected directly by virtue of connections 160 and 161 respectively to caption character fonts 221 and 321.

Because of the required memory capacity of caption character font 321, a selector generator 162, depicted in FIG. 6A, is required in association with the scan counter 322. Selector generator 162 selects the chips addressed by the scan counter 322 and sequentially advances the scan counter 322 from one chip 396 to the next by virtue of connections 163. Selector generator 162 advances in response to outputs from a counter 164 which is a recycling bit counter that counts up to 12 bits. Outputs at 165 and 166 from the bit counter 164 are fed through an AND gate 167 to the scan counter 322 to increment the scan counter 322 after the cursor 14 has advanced through a predetermined number of rows to define a row grouping sufficient to encompass the width of the caption characters to be printed.

Another bit counter 328 corresponding to the bit counter 28 in FIG. 2, is a recycling bit counter that produces an overflow output through OR gate 168 and through flip-flop circuit 169 to provide a load signal to shift register 327 and to provide clocking pulses to the bit counter 164. Thus, each time the bit counter 328 overflows, the shift register 327 outputs the video signals loaded therein through the cable driver 170 to the video output signal line 171, where the bits are transferred to the printer 11.

Figure 8:
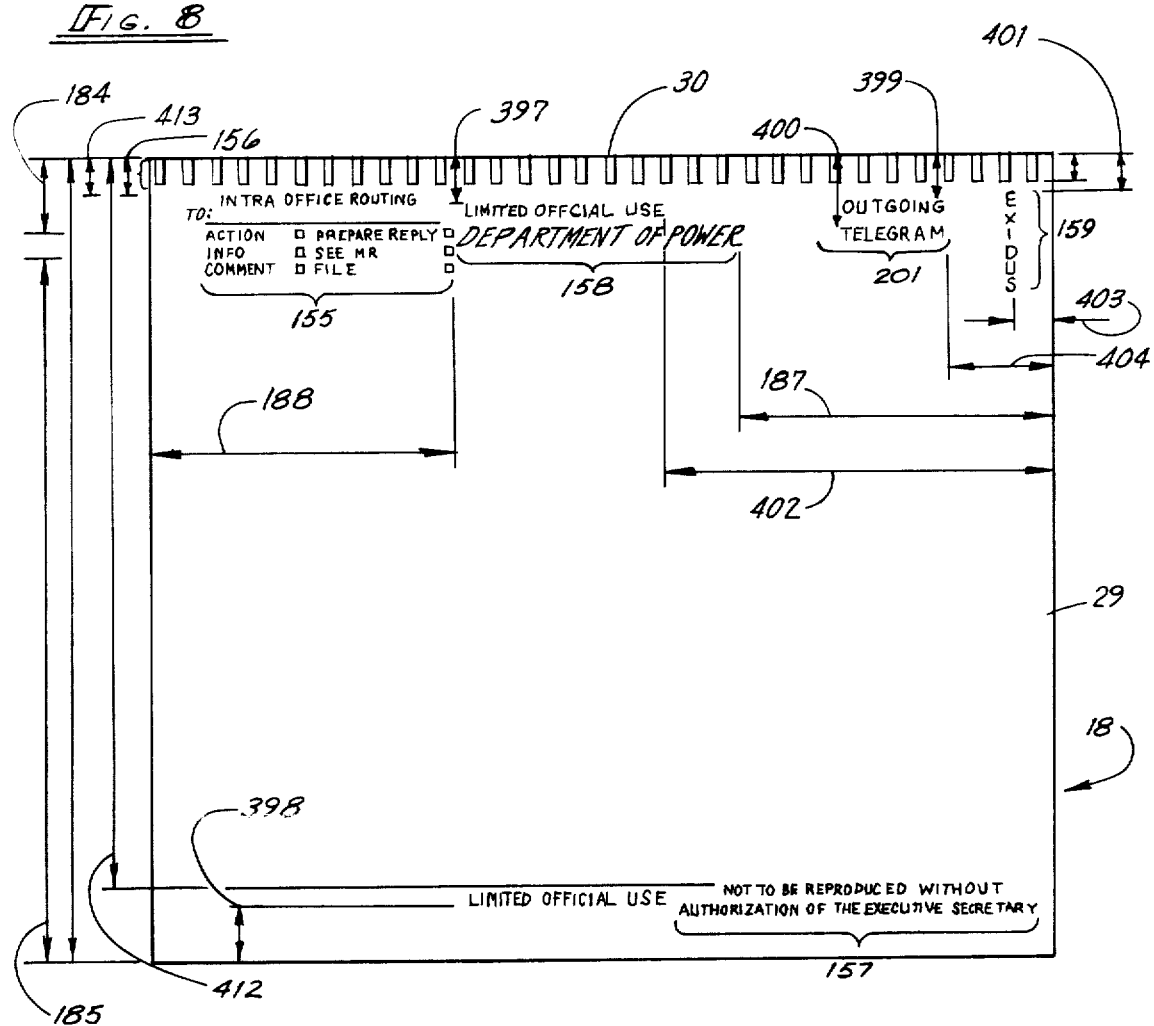
FIG. 8 illustrates samples of caption format information provided according to the invention.

The scan counter 322 and the caption font 321 in the preferred embodiment of the invention are dedicated to producing the single item of caption information "Department of Power" in italicized form as indicated at 158 in FIG. 8. Since only a single horizontal line of characters is required, the scan counter 322 need only run through one complete cycle for each page 18. Unlike the scan counter 22 in the message interface unit 12, the scan counter 322 does not signal a current character register to provide new character codes to an address register. To the contrary, the scan counter 322 serves as a caption character grouping signal provision means for providing row caption grouping signals, which signals are the overflow and reset signals on line 172. Each of the signals on line 172 is representative of a preselected plural number of rows within which visual caption character representations in the caption display 158 wholly lie. Thus, the matrix imaging means within the printer 11 including the pattern generator 66 is connected to the caption storage font 321 through the shift register 327 by lines 533.

The modulator 66 acts upon the cursor 14 to reproduce ones of the caption section patterns from caption storage 321 on the visual record medium 18 within a caption field, analogous to the fields 48 and 49 employed in association with the message video signals. The caption fields, like the message fields, encompass a predetermined number of area locations within a linear caption row analogous to the message text rows 38-45 depicted in FIG. 7. Each of the caption section patterns from memory storage 321 is visually reproduced. Because there is only one line of characters in the caption information display 158, the character field signal on line 172 is indicative of the last necessary pattern of video signals within a particular scan 15. Accordingly, the field or overflow signal from the scan counter 322 on line 172 resets a flip flop 173 thereby causing the output of that flip flop on line 174 to go low, thus inhibiting further counting within the bit counter 328. This of course prevents bit counter 328 from strobing out video signals from the shift register 327. Bit counter 328 is not again enabled until the scan sync pulse is generated from within the printer 11 by the matrix imaging means. This scan sync pulse indicates that the cursor 14 has completed scanning along a raster path 15 and is stepping along path 17 to its initial index to begin scanning along the next subsequent raster path 15.

The scan sync signal 89 is received at AND gate 175. A signal is passed from AND gate 175 in response to the scan sync signal to reset the flip flop 177, and hence also reset the bit counter 328. The overflow signal 174 from the scan counter 322 that resets flip flop 173 also causes the flip flop 173 to clear the dual one shot element 178. This in turn causes the output 179 to go low thereby causing the output at 180 from the voltage controlled oscillator 181 to go low for a predetermined time as established by the capacitor 182 connected to the voltage controlled oscillator 181.

Since the output lead 180 carries the clocking pulses for the bit counter 328, the combined effect of the interaction of the flip flop 173, the one shot 178 and the voltage controlled oscillator 181 and capacitor 182 is to form an inhibit circuit 183 which is connected to the shift register 327 and which serves as a caption trigger and accessing device connected to draw information from the caption storage character font 321. In this way, the inhibit circuit 183 disables the bit counter 328 and the shift register 327 during each scan to provide a margin as indicated at 184 in FIG. 8, along the upper edge of the sheets of paper 18.

Because the inhibit circuit 183 is actuated by the overflow signal on line 172 from the scan counter 322, the inhibit circuit is actuated following the transmission of the final video signals in the character field within each row. Thus, the inhibiting circuit 183 goes immediately into operation and thereby also provides a lower margin 185 within which printing is inhibited. All printing from the caption character font 321 to print the caption information 158 is thereby confined to the space between the upper margin 184 and the lower margin 185.

Similar inhibit circuitry at 186 is provided to produce a horizontal margin 187 associated with "DEPARTMENT OF POWER" at the leading edge 29 of each sheet of paper 18, as well as a horizontal margin 188 at the opposing edge of the sheet of paper. When a page mark pulse 527 is received at AND gate 176 indicating that the cursor 14 has completely scanned a page 18, a signal is generated and passed to the one shot trigger circuit 189. Upon receipt of the input, the trigger circuit 189 generates an output at 190 which holds the scan counter 322 in a reset condition for a period of time determined by the value of capacitor 191. When the one shot circuit 189 times out, its output again goes high, thus removing the reset signal from scan counter 322 that inhibits operation of the scan counter 322. During the time that the scan counter is inhibited, however, the margin 188 of the sheet of paper 18 and the margin 187 of a subsequently positioned sheet of paper 18 are established.

A further feature of the embodiment of the invention depicted is the circuitry at 192 in FIG. 6A which is used to establish the series of stripes 156 in the caption display of FIG. 8. A control bit from the computer is received at input 193 which sets in motion a series of signals that lead to the establishment of periodic stripes 156. The one shot univibrator 194 determines the length along the scan paths 15 during which the cursor is actuated to darken area locations 32 while the interconnection of univibrators 195 and 196, the flip flop 197 and the OR gate 198 alternately produce signals to actuate the cursor 14 to darken or leave undarkened area locations 32. The alternating cycles of univibrators 195 and 196 occur at 6.5 millisecond intervals. The outputs from OR gate 198 and univibrator 194 are combined in an AND gate 199 and passed to a video collector 200.

Figure 6B:
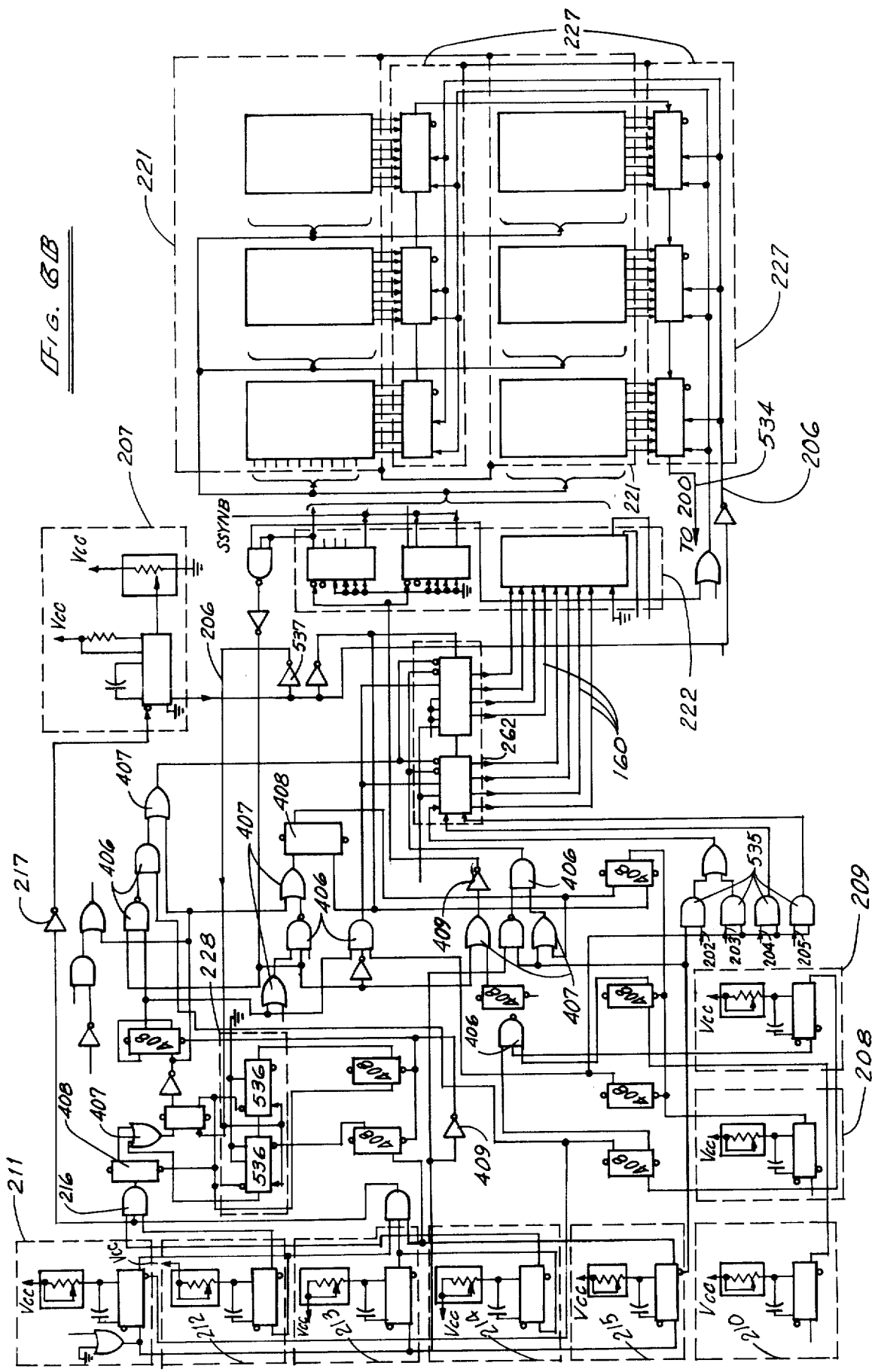

Circuitry analogous to much of the foregoing circuitry associated with caption character font 321 is likewise associated with caption character font 221 and is depicted in FIG. 6B. The principal differences in connection with the circuitry involved revolve around the fact that the caption designation 158 is produced on all documents, and so requires no computer control bit to initiate a print operation. Also the caption displays 155, 157, 159 and 201 include plural lines of characters positioned within different fields within each such display.

Referring now to FIGS. 6 and 10, it can be seen that a shift register 227 is associated with the caption character font 221 and operates in much the same manner as the shift register 327 to provide video signals on line 534 to the OR gate 200 in FIG. 6A. A selector generator 262 is responsive to computer control bits received from OR gates 535 at lines 202, 203, 204 and 205 to provide address information to the caption character font 221 on lines 160 through the scan counter 222, rather than directly to the caption character font.

A bit counter 228 having counting units 536 corresponds to the bit counter 328 and is connected to the selector generator 262. A common clock line having sections 206 and 206' strobes the bit counter 228 as well as the shift register 227. An inverter 537 is interposed between circuit elements 206 and 206' of the clock line. This clock line is fed pulses by the dual voltage control oscillator 207. The oscillator 207 performs the final steps of an inhibit function the time intervals for which are controlled by timing circuits 211 through 215. These timing circuits produce outputs and act through AND gate 216 and an invertor 217 to provide an input to the oscillator 207.

The timer 211 creates an inhibit signal to produce the top margin 397 in FIG. 8 associated with the initiation of video character representations appearing to produce the caption designation "LIMITED OFFICIAL USE" at the top of the sheet of paper 18. Similarly, the timer 212 produces the bottom margin 398 associated with the designation "LIMITED OFFICIAL USE" at the bottom of the sheet of paper 18. The timer 213 is connected to produce the top margin 399 adjacent to edge 30 associated with the word "OUTGOING" or "INCOMING" while the timer 214 produces the top margin 400 from edge 30 associated with the word "TELEGRAM". The timer 215 produces a signal resulting in the top margin 401 from edge 30 associated with the caption designation "EXDIS" at 159. The timer 210 receives the page sync signal 137 and is actuated to produce the margin 403 associated with the bold face print of display 159.

The timer 208 is employed to produce the margin 404 associated with caption designation 201 while timer 209 produces the margin 402 from edge 29 of sheets of paper 18 for use with the designations "LIMITED OFFICIAL USE" both at the top and bottom of the sheet of paper.

By using the timers 209 through 211 in the manner depicted, a great deal of memory storage area is saved, since no video signal information need be employed in association with area locations 32 lying within margins in conjunction with the production of caption information by the printer 11.

Various AND gates 406, OR gates 407, flip flop circuits 408, and inverters 409 are employed in association with the timers to produce the appropriate loading signals clocking signals, and address data associated with the caption information when interconnection in the manner depicted in FIGS. 6A and 6B.

In a like manner, the timer 410 in FIG. 5A provides a signal to AND gate 411 indicative of the distance 412 from the upper edge of the sheet of paper 18 to the initial character field in which character representations appear in the caption designated at 157 in FIG. 8. In the same manner, the timing circuit 413 provides an input to AND gate 411 to establish the margin 413 between the upper edge 30 of the sheet of paper 18 and the initial character field associated with caption display 155.

In the absence of outputs from either timer 410 or timer 413, clocking pulses are provided to the sequencer 414, comprised of a series of interconnected counters 415. The collective outputs from the counters 415 are supplied through the register 416 to the selector registers 94 in FIG. 5B. Thus, during the time that the shift register selection line 417 is high, the inputs from the selector 414 will be gated through the data selector elements 94 in the address register 26 and will access information out of particular areas in the memory bits in the form of ASCII codes from the computer 10, which will enter the address register 26 and will access out video signals associated with message text.

Similarly, the scan counter 22 of the scan counter 422 may alternatively be selected to provide inputs to the address register 26. A bit counter 428 is associated with the sequencer 414. Thus, the bit counter 428 increments the sequencer 414 to provide new addresses to the register 416 through an OR gate 429 and a flip flop circuit 430. One output of flip flop 430 is inverted by invertor 431 and serves as a clock pulse to the sequencer 414. The clock pulse thus changes the states of the output lines of the individual registers 415 to access out of memory 21 selected video signals associated with the displays 155 and 157.

The other output of flip flop 430 provides an input through OR gate 432 to another flip flop 433 to indicate the last load of the shift register 27 in the last caption character field in the caption character display 155. The output at 434 resets flip flops 435 and 436. The flip flop 436 actuates yet another timing element 437 which determines the margins from edge 29 of a sheet of paper 18 for both the caption displays 157 and 155. The flip flop 435, when subjected to the reset signal, and until strobed by the timer 437, removes one of the inputs to AND gate 107. This in turn inhibits the loading function of the shift register 27.

One of the outputs from the flip flop 435 acts through a NAND gate 438 which has as its other input a signal from flipflop 436. NAND gate 438 pulses a flip flop 439 which acts through an OR gate 440 and an invertor 441 to provide a load signal 540 to the bit counter 422. Since the data leads of the bit counter 422 are grounded, the load signal has the effect of resetting the bit counter 422.

From the foregoing detailed description of the operation of the present invention it can be seen that by using hard wired circuit elements in the interface adapters 12 and 13 for message and caption information respectively, a very significant programming load can be removed from the computer 10. Thus, the character code adapter unit of this invention has the effect of expanding the capacity of a computer 10 when used with a printer 11 in the manner described herein. Undoubtedly numerous variations and modifications of the present invention will become readily apparent to those knowledgeable in techniques of interfacing computers with printers. However, the scope of the present invention should not be limited to specific embodiment depicted herein, but rather is defined in the claims appended hereto.

I claim:

1. Interface apparatus for use in adapting digitized bits of encoded character representations of message information from a computer to a form suitable for use with a printer that employs a cursor to scan in a raster parallel to a first axis and to move relative to a second axis perpendicular to said first axis to subsequent scans to effect permanent recordation of print characters utilizing a predetermined plurality of scans parallel to said first axis to produce each character on laminar record media comprising:

buffer storage means for receiving the digitized bits of encoded character representations, current character storage means for retaining bit representations of a plurality of the digitized bits of encoded character representation next to be printed, memory storage means for storing sets of video signals associated with particular characters in a character font and with particular scans in the aforesaid plurality of scans, scan counting means that is incremented and reset in response to separate actuating signals from said printer and which provides a current scan count and also provides an advance signal to update the contents of said current character storage means each time a predetermined count is reached, address means connected to said memory storage means and to said scan counting means and sequentially responsive to the bit representations of the plurality of the digitized bits of encoded character representation currently being processed and to the current scan count to sequentially access sets of video signals from said memory storage means, shift register means connected to said memory storage means for sequentially passing sets of said video signals to said printer as said sets are accessed out of memory storage means, a recycling bit counter for providing an actuating signal to said shift register means to effectuate transfer of said video signals to said printer each time a predetermined count of said recycling bit counter is reached, caption storage means for storing ones of sets of video signals associated with particular characters in a character font dedicated to the production of predetermined caption information, caption accessing means for accessing ones of said sets of video signals out of said caption storage means in a preselected order determined in accordance with the character sequence required by said predetermined caption information, caption signal shift register means for receiving each set of video signals from said caption storage means with the signals in each set in a predetermined arrangement therein, and for sequentially passing said sets of video signals of said caption storage means to said printer as they are accessed out of caption storage means, caption scan counting means incremented in response to a signal from said printer and operative in association with said accessing means to provide a current scan count to sequentially gate portions of said caption storage means, to allow accessing of video signals therefrom, first axis inhibit means for enabling operation of said accessing means only after the elapse of a first preselected interval of time, second axis inhibit means for enabling operation of said caption scan counting means only after the elapse of a second preselected interval of time, caption bit counting means for providing an actuating signal to said caption signal shift register means to effectuate transfer of said video signals of said caption storage means to said printer each time a predetermined count of said caption bit counting means is reached, and caption bit counter enabling means connected to enable said caption bit counting means in response to a dedicated digitized input signal provided in association with said digitized message information.

2. Interface apparatus for use in adapting digitized bits of encoded character representations of message information from a computer to a form suitable for use with a printer that employs a cursor to scan in a raster parallel to a first axis and to move relative to a second axis perpendicular to said first axis to subsequent scans to effect permanent recordation of print characters utilizing a predetermined plurality of scans parallel to said first axis to produce each character on laminar record media comprising:

buffer storage means for receiving the digitized bits of encoded character representations, current character storage means for retaining bit representations of a plurality of the digitized bits of encoded character representation next to be printed, memory storage means for storing sets of video signals associated with particular characters in a character font and with particular scans in the aforesaid plurality of scans, scan counting means that is incremented and reset in response to separate actuating signals from said printer and which provides a current scan count and also provides an advance signal to update the contents of said current character storage means each time a predetermined count is reached, address means connected to said memory storage means and to said scan counting means and sequentially responsive to the bit representations of the plurality of the digitized bits of encoded character representation currently being processed and to the current scan count to sequentially access sets of video signals from said memory storage means, shift register means connected to said memory storage means for sequentially passing sets of said video signals to said printer as said sets are accessed out of memory storage means, a recycling bit counter for providing an actuating signal to said shift register means to effectuate transfer of said video signals to said printer each time a predetermined count of said recycling bit counter is reached, caption memory means having a plurality of memory units for storing video signals associated with particular portions of characters in a character font dedicated to the production of predetermined caption information, caption scan counting means for addressing said units of said caption memory means to access video signals out of memory in a preselected order determined in accordance with the character sequence required by said predetermined caption information and in accordance with raster displacement in said printer perpendicular to said first axis, memory unit selection means for sequentially gating said units of memory to sequentially elicit video signals from sequential units of said caption memory means, caption signal shift register means having a plurality of storage locations for storing video signals from said caption memory means in separate storage locations, and for serially passing said video signals stored in said caption shift register means to said printer, and recycling counting means for incrementing said memory unit selection means for a predetermined number of caption bit counts and for actuating said caption signal shift register means to pass said video signals of said caption memory means to said printer and increment said scan counting means each time the aforesaid predetermined number of caption bit counts is achieved.

3. In interface apparatus for use in adapting digitized message information to a form compatible with a printer that employs a cursor to scan in a raster sequentially along a plurality of parallel linear rows each row containing a predetermined number of area locations of uniform geometry and to move in stepwise fashion to subsequent rows located a uniform distance apart to record a permanent image on a visual record medium, the improvement comprising:

- memory storage means for storing video signals indicative of the patterns of relatively light and dark areas in linear sections at uniform row intervals through visual representations of characters in a character font of which the digitized message information is comprised,
- means for providing character field signals each representative of sequential fields of a first preselected plural number of sequential locations of areas in each of the linear rows from said memory storage means,
- row grouping means for providing row grouping signals each representative of a second preselected plural number of the linear rows from said memory storage means within which visual character representations located therein wholly lie,
- matrix imaging means connected to said memory storage means, and including modulating means for acting upon said cursor to reproduce ones of the aforesaid patterns from said memory storage means on said visual record medium within a field in a linear row synchronously following a character field signal from said character field signal means, whereby all patterns reproduced within a first row within a group of rows from said row grouping means are associated respectively with sections through selected visual character representations at the first one of the aforesaid intervals,
- stepping means to alternately step said cursor to the next subsequent linear row and to actuate said modulating means to call patterns of said video signals from memory storage means and reproduce remaining sections of the ones of the aforesaid patterns to complete the same associated character representations one interval at a time,
- character selection means responsive to said row grouping signals from said row grouping means for sequentially designating the character representations to be produced on said record medium in succeeding groups of rows,
- caption storage means for storing video signals indicative of caption section patterns of relatively light and dark areas in linear sections at a uniform interval through second visual representations of different size from the previously aforesaid visual representations of characters in a caption character font of which caption information is comprised,
- caption character field provision means for providing caption character field signals each representative of sequential caption character fields of a third preselected plural number of the aforesaid area locations in each linear row,
- caption character grouping signal provision means for providing row caption grouping signals each representative of a fourth preselected plural number of groups of rows within which visual caption character representations located therein wholly lie,
- whereby said matrix imaging means is connected to said caption storage means and said caption character field provision means and said caption character grouping signal provision means and,
- whereby said modulating means acts upon said cursor to reproduce ones of the aforesaid caption section patterns from said caption storage means on said visual record medium within a caption field in a linear caption row synchronously following a caption character field signal so that all of said caption section patterns reproduced within a first caption row within a group of caption rows are associated respectively with sections through selected ones of the aforesaid second visual representations of different size at intervals corresponding to intervals between said rows, and
- whereby said stepping means actuates said modulating means to call caption section patterns from said caption storage means and reproduce ones of said caption section patterns to complete the remaining sections of the same associated second visual representations of different size one interval at a time within said fourth preselected number of groups of rows, and to thereafter in similar fashion produce further predetermined ones of visual representations of different size separately within caption character fields within caption character groups of rows.

4. The interface apparatus of claim 3 further comprising caption trigger and accessing means connected to actuate said caption storage means, said caption character field provision means and said caption character grouping signal provision means to reproduce ones of said second visual representations of different size in a predetermined array.

5. The interface apparatus of claim 4 further comprising inhibit means connected to said caption trigger and accessing means to provide margins along the initial edge encountered in scanning each element of visual record media.

* * * * *